United States Patent [19]

Antonini et al.

[11] Patent Number: 4,466,623
[45] Date of Patent: Aug. 21, 1984

[54] STEERING BALL SEAL

[75] Inventors: Joseph Antonini, Chicago, Ill.; Frank W. Zawodni, Ft. Wayne, Ind.

[73] Assignee: Dana Corporation, Toledo, Ohio

[21] Appl. No.: 500,042

[22] Filed: Jun. 1, 1983

[51] Int. Cl.³ .............................................. F16J 15/32
[52] U.S. Cl. .................................... 277/153; 277/92; 301/124 H
[58] Field of Search ...................... 277/84, 92, 95, 152, 277/153, 182, 183, 184; 180/254; 301/124 H; 64/32 R; 308/36.1

[56] References Cited

U.S. PATENT DOCUMENTS

| | | |
|---|---|---|
| 3,005,648 | 10/1961 | Christensen . |
| 3,472,331 | 10/1969 | Baker et al. . |
| 3,520,541 | 7/1970 | Rohani . |
| 3,640,540 | 2/1972 | Larsson ................... 277/95 |
| 3,658,395 | 4/1972 | Hallerback . |
| 3,727,923 | 4/1973 | McEwen ................ 277/153 |
| 3,771,799 | 11/1973 | Sekulich ................ 277/84 |
| 3,985,365 | 10/1976 | Catanzaro . |
| 4,093,244 | 6/1978 | Boutant ................. 277/153 |
| 4,103,901 | 8/1979 | Ditcher . |
| 4,327,922 | 5/1982 | Walther ................. 277/153 |
| 4,337,953 | 7/1982 | Ikeda et al. ............ 277/152 |
| 4,389,053 | 6/1983 | Innis et al. ............. 277/84 |
| 4,428,630 | 1/1984 | Folger et al. .......... 277/153 |

Primary Examiner—Robert I. Smith
Attorney, Agent, or Firm—Frank B. McDonald

[57] ABSTRACT

A steering ball seal includes a rigid annular outer case having a radially extending elastomeric sealing member bonded thereto. The sealing member includes a pair of sealing lips which extend radially inwardly of the case. The sealing member further includes an integral annular protective assembly tab which extends axially thereof and which contains a radially protruding retention ridge. The sealing member also includes an integral retention bead radially outwardly of the ridge. The lip and bead cooperate to provide for resilient insertion and removal of an inner case which is retained against the radial body of the sealing member to provide rigidity of the member during operation of the seal. In a preferred form, the inner case is of resilient polyethelene material, and includes a split body construction to facilitate its installation over the steering ball. During assembly of the seal over the steering ball, only the protective assembly tab makes contact with the spherical portion of the steering ball assembly, as the pair of sealing lips are elastically deflected out of contact therewith by the protective assembly tab.

10 Claims, 3 Drawing Figures

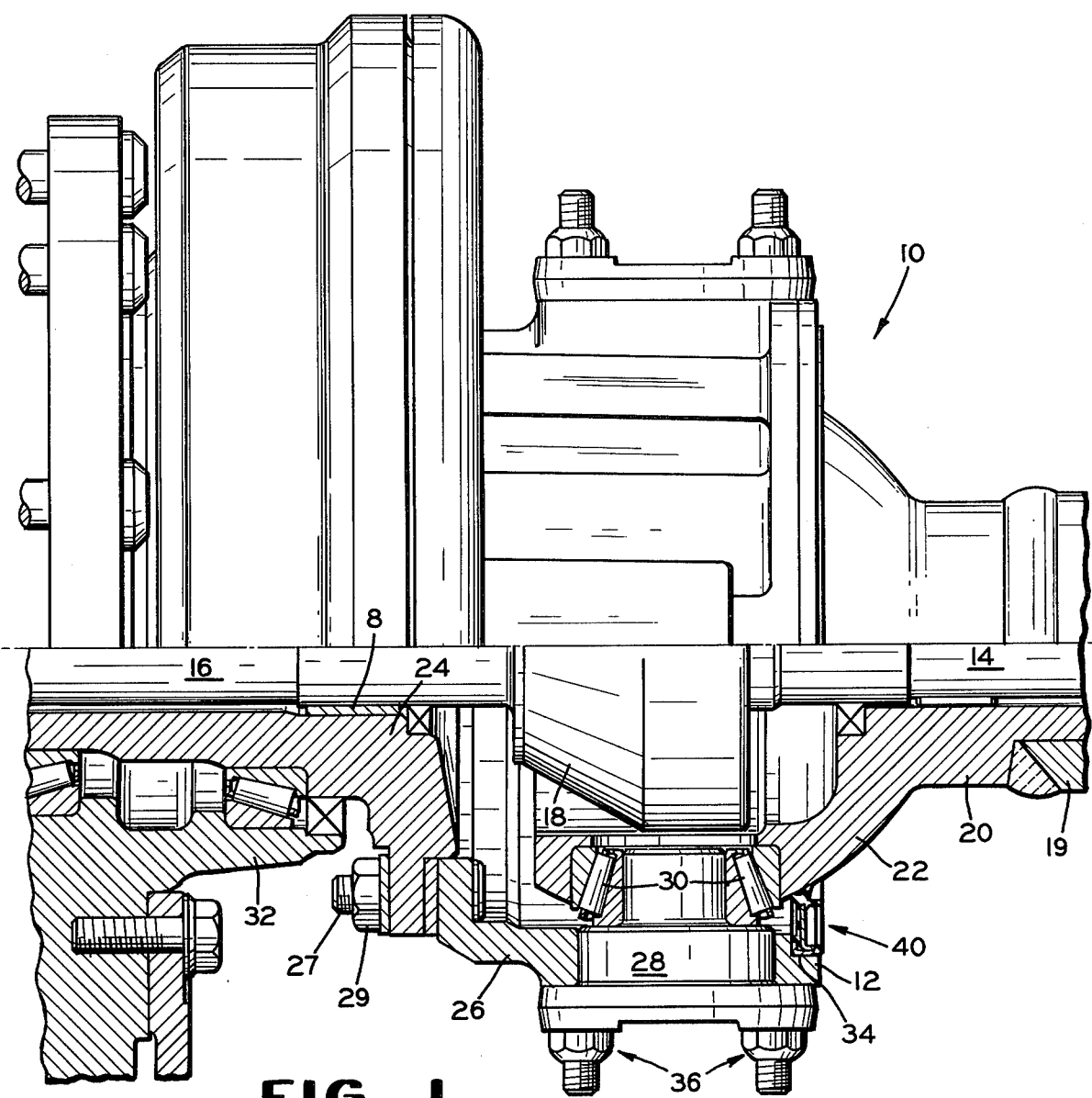
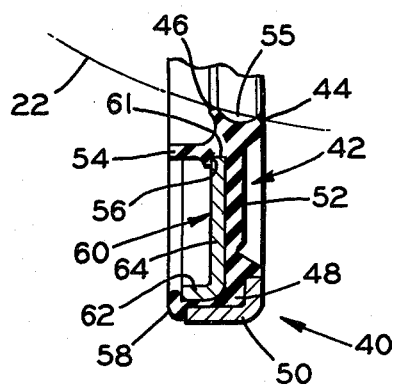
FIG. 2
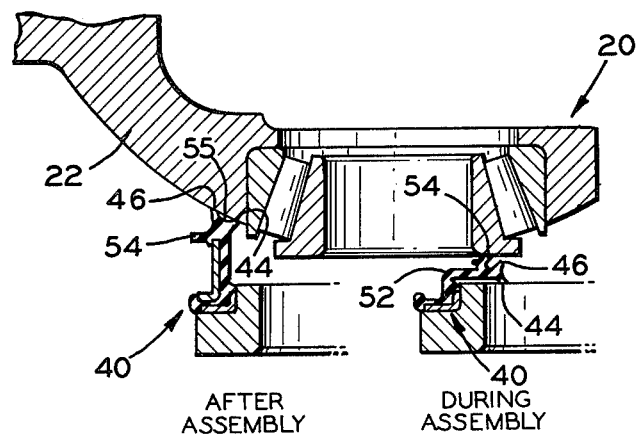
FIG. 3

STEERING BALL SEAL

BACKGROUND OF THE INVENTION

The present invention relates to a sealing device for protecting the trunnion socket portion of a drive axle steering ball assembly in a front drive vehicle from foreign matter such as muddy water and debris. More particularly, the invention relates to a sealing device including at least one annular seal member made of an elastomeric material to permit resilient slidable contact thereof with the spherical outer surface of a steering ball assembly. Numerous designs of annular seal members for this purpose have been utilized in the prior art. The bulk of these designs have required an objectionable multiplicity of parts. Others have required slits in the elastomeric sealing parts for purposes of fitting the seal member to the typical spherical ball surface of the steering member. Such slits have permitted road water and debris to enter the trunnion socket and to thus accelerate deterioration of the steering assembly.

Another deficiency of prior art seals for steering balls has been related to the difficulty of avoiding damage to the sealing lips while installing the seal over the steering knuckle. Another has been related to the lack of rigidity and hence control of the elastomeric body portion of the seal member during operation of the steering ball.

SUMMARY OF THE INVENTION

The present invention provides a steering ball seal made of a unitary readily deformable, elastomeric member. As such, the seal does not require a multiplicity of sections and parts generally attributable to leakage problems of prior art steering ball seals. Moreover the seal of the present invention does not require slits for facilitating installation over the outer peripheral surfaces of the steering ball assembly. In addition, the seal includes means for controlling the rigidity of the radially extending elastomeric body portion of the seal, and includes provisions for insertion and removal of the seal between operations without damage to the sealing lips.

In a preferred embodiment the seal provides a rigid annular outer case which supports an annular elastomeric sealing member. The sealing member includes a pair of sealing lips which extend radially inwardly of the outer case. The sealing member further includes an axially extending annular tab for protecting the sealing lips during installation of the seal. The tab contains an integral radially protruding retention ridge for accomodating an inner case member. Radially outwardly of the retention ridge is an integral retention bead which cooperates with the ridge to provide for resilient insertion, removal, and retention of an inner case. The inner case imparts rigidity to the otherwise flexible body of the deformable sealing member during operation. The inner case comprises an annular resilient one piece split design to enable the member to be elastically stretched apart, whereby the member may be easily installed over the external neck portion of a spherical steering assembly. In a preferred embodiment the inner case member is of a polyethelene material.

BRIEF DESCRIPTION OF THE DRAWINGS

FIG. 1 is a fragmentary cross sectional view of a steering ball assembly which includes a preferred embodiment of the seal mechanism of the present invention.

FIG. 2 is an enlarged view of a preferred embodiment of the seal mechanism of FIG. 1.

FIG. 3 is a fragmentary enlarged view of a steering knuckle which forms a portion of the steering ball assembly of FIG. 1.

DETAILED DESCRIPTION OF A PREFERRED EMBODIMENT

Referring initially to FIG. 1, a steering ball assembly 10 includes a drive shaft 14 which propels a drive axle 16 through a universal joint 18. Circumferentially about the drive shaft 14 is positioned a steering yoke 20, which in the embodiment shown is welded to an axle housing arm 19. The yoke 20 contains a spherical surface 22 which covers the right half of the universal joint 18 as shown. A knuckle spindle 24 supports the drive axle 16, the spindle 24 being secured to a steering knuckle 26 by means of studs 27 and bolts 29. The steering knuckle 26 has a pair of opposed flanges 12 at its extreme right end containing openings through which king pins 28 are diametrically opposed (only one king pin-flange combination is shown). The king pins 28 are affixed to the knuckle 26 by fasteners 36, and are also inter-connected with the spherical surface 22 of the steering yoke 20 through a taper roller bearing system 30. The bearing system 30 permits the steering knuckle 26 to rotate about the common longitudinal axis of the king pins 28. A wheel hub 32 rotates with the drive axle 16, the hub being disposed for mounting thereon a brake drum and a wheel disc (neither shown).

In the preferred embodiment described, the steering ball assembly is designed for a front wheel drive axle of an associated vehicle. When the vehicle is to be steered, a steering wheel (not shown) is operated to rotate the steering knuckle 26 about the king pins 28. Thus it will be appreciated by those skilled in the art that the knuckle spindle 24, front drive axle 16, and wheel hub 32 all rotate with the steering knuckle 26 about the common axis of the king pins 28 to effect steering of the associated vehicle.

A seal assembly 40 protects the bearings, king pins, and other internal parts from mud, water, and road debris. The assembly 40 provides a constant sealing contact with the spherical surface 22 of the steering yoke 20.

Referring now to FIG. 2, the seal assembly 40 includes an elastomeric sealing member 42. In the preferred construction shown, the elastomeric sealing member is of a dual lip design, and thus an oil lip 44 and a dirt lip 46 operate in concert to provide desired protection from the elements to which the steering assembly are exposed. The elastomeric sealing member 42 is supported in an outer annular case 50, and in the preferred embodiment shown is bonded to the case 50 at its radially outermost, or, as viewed herein, upper, portion 48. The sealing member 42 also includes a radially extending elongate body portion 52 which is axially deformable to enable transverse deflection of the lip portion thereof relative to the steering knuckle 26 of the assembly 10 as will now be described.

Referring momentarily to FIG. 3, a steering knuckle 26 is shown, wherein the seal assembly is shown in two positions, one "during assembly" the other "after assembly". Referring now to both FIGS. 2 and 3, it will be noted that a tab 54 is positioned adjacent the dual lips 44 and 46 to provide for protection of the lips during assembly. Thus during assembly, the tab 54 makes and maintains contact with the steering yoke 20, while the radially elongate body portion 52 is elastically deflected rightwardly to enable the lips 44 and 46 to remain clear of physical contact with the steering yoke and hence to protect the lips from damage during installation of the seal assembly 40. In the view depicting the position of the seal assembly 40 after assembly, it will be seen that the elongate elastic body portion 52 has resumed its unstressed form, and that the sealing lips 44 and 46 are then in contact with the spherical surface 22 of the steering yoke 20. It will also be noted that after assembly, the seal assembly 40 includes an annular inner case 60, which is of a "split" design, and hence includes a pair of abutting ends (not shown) which are elastically stretched apart for permitting installation of the case 60 about the neck portion of the steering yoke 20.

Referring now specifically to FIG. 2, the inner case 60 is retained against the body of the sealing member 42 by means of an annular ridge 56, and a circumferentially extending bead 58. The ridge and bead cooperate to position the split inner case 60 and hold same against the body of the sealing member 42. The purpose of the inner case is to provide a desired lateral or axial rigidity to the sealing member body as is necessary for ensuring continuous contact between the surface 22 and the sealing lips during operation of the steering ball assembly. In addition, a radial rigidity is assured by the internal diameter edge 61 of the inner case, which provides a hoop force comparable to and in lieu of that provided by a conventional garter spring In the preferred embodiment the bead 58 makes physical contact with an upper axially extending leg 62 of the inner case, while the ridge 56 makes contact with a radially extending lower leg 64 of the inner case 60. Together the ridge and bead define means for assuring fixed placement of the inner case 60. Moreover, it should be pointed out that the ridge and bead portions are integral with the sealing member 42. They are preferably molded as part of the sealing member 42, which as noted earlier is subsequently bonded to the outer annular case 50 at its upper portion 48.

In a preferred form the assembly tab 54 operates as both a protective member, as during assembly per FIG. 3, and also provides a manual insertion and removal device for the inner case 60. Thus referring back to FIG. 2, by pulling the assembly tab downwardly toward the spherical portion 22 of the trunnion socket, the inner case 60 may be readily removed, as the circumferential ridge 56 will be thereby elastically moved downwardly away from the bead 58. Conversely the same procedure will allow or facilitate the insertion or re-insertion of the case member 60. Also, in the preferred embodiment the outer case 50 is made of steel or other metal material, although this invention is amenable to the use of yet other materials for providing an outer case member or support shell. The preferred emphasis of selection is that the material be rigid and non-resilient.

Also, in the preferred embodiment, the inner case 60 is of a polyethelene material to permit elastic deformation for facilitating disassembly and re-assembly of the seal for service of the steering assembly 10. As a material for this purpose, polyethelene has proved to be less expensive, lighter, and easier to fabricate than other resilient materials. It is also resistant to corrosion.

The seal may be installed in the following preferred method. First, the seal asembly 40 *without the inner case* 60 is pressed into the steering knuckle 26, and seated against a shoulder 34 (FIG. 1). A coating of grease is applied to the spherical surface 22 of the steering yoke 20, and the circumferential cavity 55 between the sealing lips 44 and 46 is filled with grease. The knuckle and seal assembly is then installed over the trunnion socket (FIG. 3) during which the radially extending elongate body portion 52 of the elastomeric sealing member 42 will deflect rightwardly (as shown) to allow passage of the steering yoke 20 therethrough. The resulting deformation of the member 54 will thus protect the sealing lips 44 and 46 as aforedescribed.

Next the steering knuckles are affixed to the ball yoke in a conventional manner, which includes the insertion of the king pins 28. The split inner case 60 is installed over the neck portion of the spherical steering ball surface 22. For this purpose, the molded tab 54 of the member 42 is pulled radially inwardly to elastically stretch the ridge 56 from the bead 58. Starting at one of the abutting ends of the inner case, the inner case is inserted circumferentially between bead and ridge.

Although a preferred embodiment of the seal assembly of the present invention has been fully detailed and described herein, there are numerous equivalent embodiments which fall within the spirit of the appended claims.

What is claimed is:

1. A steering ball seal comprising an annular outer case, an inner case, and an elastomeric sealing member supported by said outer case, said sealing member including at least one sealing lip extending radially inwardly of said outer case; said sealing member further including an axially extending annular protective assembly tab, said tab including an integral radially protruding retention ridge, said sealing member also including an integral retention bead radially outwardly of said retention ridge; said ridge and said bead cooperating to provide for resilient insertion, removal, and retention of said inner case against said sealing member.

2. The seal of claim 1 wherein said sealing member further comprises a deformable body portion intermediate said outer case and said protective assembly tab.

3. The seal of claim 2 wherein said inner case comprises a resilient split body having a pair of abutting ends, said case forming an annulus when said ends are mated.

4. The seal of claim 3 wherein said assembly tab is disposed for providing insertion and removal of said inner case by the radially inward pulling thereof to elastically increase separation between said ridge and said bead.

5. The seal of claim 4 wherein said inner case comprises a polyethelene material.

6. The seal of claim 5 wherein said sealing member is of an elastomeric material bonded to said outer case.

7. The seal of claim 6 wherein said outer case comprises a rigid, non-resilient material.

8. The seal of claim 7 wherein said sealing member comprises a pair of sealing lips.

9. The seal of claim 8 wherein said outer case is made of steel.

10. A steering ball seal comprising an annular outer case, an inner case, and an elastomeric sealing member supported by said outer case, said sealing member including a pair of sealing lips extending radially inwardly of said outer case; said sealing member further including an axially extending annular protective assembly tab, said tab including an integral radially protruding retention ridge, said sealing member also including an integral retention bead radially outwardly of said retention ridge; said ridge and said bead cooperating to provide for resilient insertion, removal and retention of said inner case against said sealing member, said sealing member further defining a deformable body portion intermediate said outer case and said protective assembly tab, wherein said inner case comprises a resilient split body having a pair of abutting ends, wherein said inner case comprises a polyethelene material, and is disposed for providing rigidity for said deformable body portion during operation of said seal.

* * * * *